May 20, 1958 R. E. CROTTY, JR., ET AL 2,835,852

LIGHTNING ARRESTOR AND ATTACHMENT THEREFOR

Filed Sept. 22, 1954

INVENTORS.
Elmer G. Hills
BY Raymond E. Crotty, Jr.
Mason, Kolehmainen, Rathburn & Wyss
Attys.

United States Patent Office 2,835,852

Patented May 20, 1958

2,835,852

LIGHTNING ARRESTOR AND ATTACHMENT THEREFOR

Raymond E. Crotty, Jr., Homewood, and Elmer Guy Hills, Des Plaines, Ill., assignors, by direct and mesne assignments, of one-half to Radion Corporation, Chicago, Ill., a corporation of Illinois, and one-half to said Hills Application September 22, 1954, Serial No. 457,646

14 Claims. (Cl. 317—69)

The present invention relates generally to lightning arrestors and more particularly to a new and improved device of this character for protecting electromagnetic wave receiving equipment from high voltage surges.

Although the device of the present invention may be employed in a number of different installations, as will be recognized by those skilled in this art, it is particularly well suited for use in conjunction with television receivers and, accordingly, the ensuing description is directed primarily to its use in this environment. Lightning arrestors are frequently connected across the transmission line leading from an antenna to a television receiver for the purpose of protecting the building upon which the antenna is mounted, the receiver and persons in proximity to the receiver from high voltage surges such, for example, as lightning discharges. The arrestors heretofore proposed for such a purpose generally are of the type which connect a high impedance or resistance between earth and the terminals of the receiver accommodating the transmission line, are of the type providing a spark gap between these terminals and earth, or are a combination of these two types. Despite prior attempts to improve the characteristics of these types of arrestors, those heretofore devised have generally introduced a certain amount of electrical capacitance between the television antenna terminals to which they are connected. Such capacitance shunts the antenna terminals and creates a mismatch, thereby preventing maximum transfer of energy from the antenna to the receiver. While the described mismatch introduces considerable problems at frequencies in the V. H. F. television band, its effect is even more pronounced at ultra high frequencies. Thus, the lightning arrestors which are presently installed on a large number of television receivers are likely to become obsolete with the advent and increased use of U. H. F. television channels.

Accordingly, the present invention has for its primary purpose to provide a lightning arrestor for use with television receivers which does not shunt the transmission line from the antenna with a high susceptance.

Another object of the present invention is to provide a relatively inexpensive attachment which will prevent many of the lightning arrestors presently in service from being rendered ineffective for use in the ultra high frequency television band.

A further object of the present invention is to provide a small attachment which is adapted to be connected with facility to lightning arrestors presently in use for the purpose of converting these arrestors for effective use in the U. H. F. television band.

Still another object of the present invention is to provide a new and improved lighting arrestor for use with television receivers which is capable of providing effective service in both the U. H. F. and V. H. F. television bands.

The invention, both as to its organization and method of operation, together with further objects and advantages thereof, will best be understood by reference to the specification taken in conjunction with the accompanying drawings in which.

Figures 1, 2, 3, 4, 5:
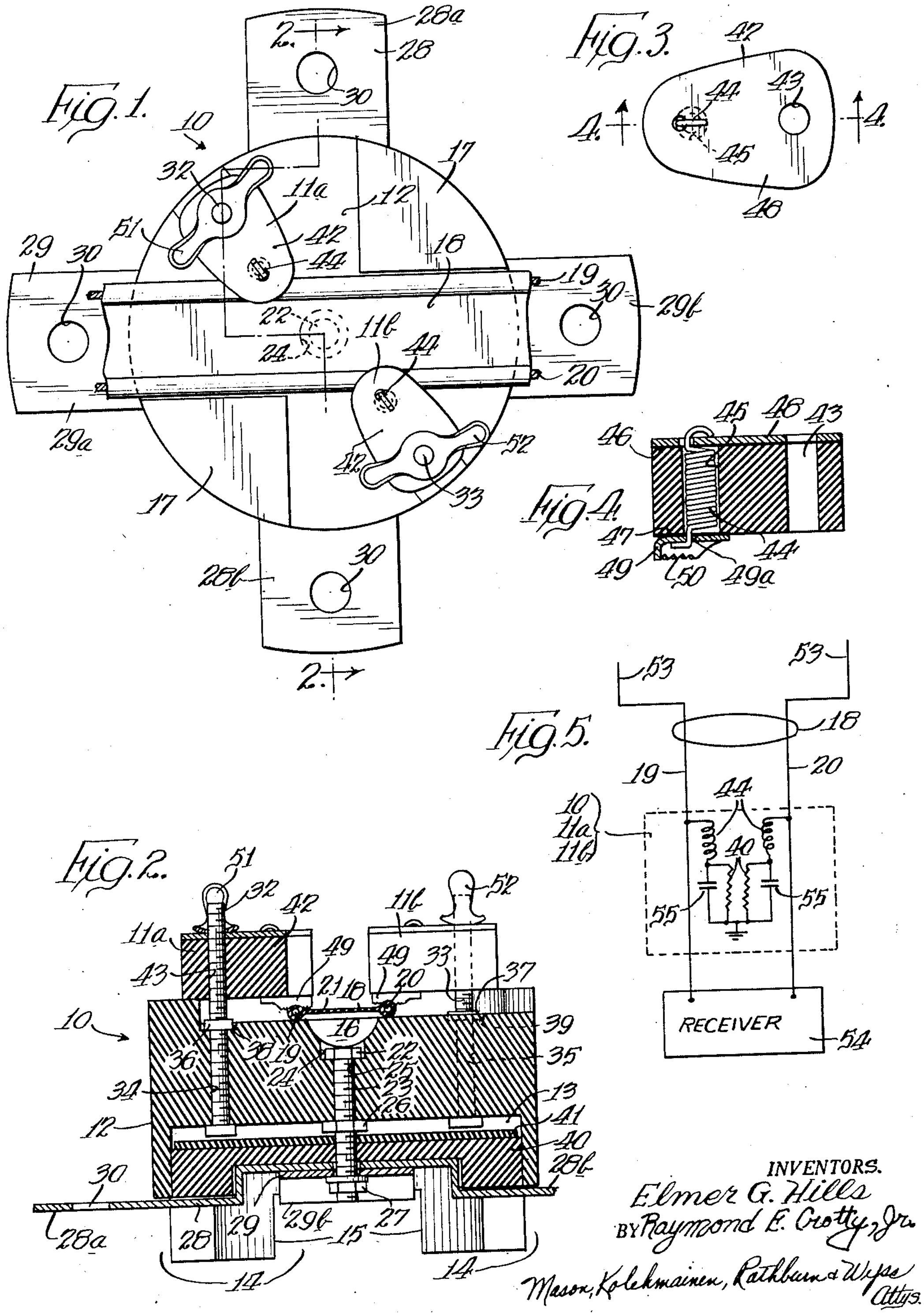
Fig. 1 is a plan view of a lightning arrestor characterized by the features of the present invention.
Fig. 2 is a cross-sectional view taken along a line substantially corresponding to the line 2—2 in Fig. 1.
Fig. 3 is an enlarged plan view of an attachment which is adapted to be mounted upon a lightning arrestor in the manner shown in Fig. 1.
Fig. 4 is a cross-sectional view taken along a line substantially corresponding to the line 4—4 in Fig. 3.
Fig. 5 is a schematic diagram illustrating the effect of the lightning arrestor of the present invention when inserted into a transmission line leading from a receiving antenna to a television receiver.

Referring now to the drawings and more particularly to Figs. 1 and 2 thereof the present invention is there illustrated as embodiment in a lightning arrestor generally indicated by the reference character 10 and having mounted thereon a pair of attachments **11*a* and 11*b*, the purpose and construction of which will become evident as the description proceeds. The lightning arrestor 10 comprises a substantially cylindrical body member 12 formed of suitable insulating material and having a cavity 13 formed in its bottom as best shown in Fig. 2. The walls of the cavity are removed at spaced regions indicated as 14 thus forming a plurality of spaced legs 15 between the spaced regions. A channel 16 extends along the top of the body member 12 from one side to the other and on opposite sides of the channel the body member is provided with a pair of raised projections or guides 17 which cooperate to position a transmission line or cable 18 along the top of the body member. The transmission line, as illustrated, is of conventional construction and comprises a pair of spaced parallel conductors 19 and 20 retained in fixed position within the cable by insulation 21**.

In order to receive the head 22 of a bolt 23, there is provided an indentation 24 formed in the center of the body member 12 and extending downwardly from the bottom of the channel 16. The bolt 23 fits within an aperture 25 extending through the body member and having its lower end exposed within the cavity 13 in order to receive a nut 26 for the purpose of affixing the blot 23 to the body member. A second nut 27 in engagement with the lower end of the bolt 23 serves to retain a pair of identical brackets 28 and 29 upon the body member. These brackets are each provided with an aperture in the center for accommodating the bolt 23 and each includes a pair of leg portions extending outwardly from the body member through opposed pairs of the spaced regions 14, the legs of the bracket 28 being designated **28*a* and 28*b* while the legs of the bracket 29 are designated 29*a* and 29*b*. For the purpose of receiving suitable screws or bolts not shown in the drawings to facilitate the mounting of the lightning arrestor 10 upon fixed structure of a house or building electrically connected to earth, each of the legs of the brackets 28 and 29 is provided with an aperture 30**.

In order to accommodate a pair of spaced terminal members or screws 32 and 33 having enlarged heads protruding into the cavity 13, there is provided a pair of spaced apertures 34 and 35 extending from the cavity 13 to the top of the body member. The terminal screws 32 and 33 extend upwardly from the body member 12 on opposite sides of the channel 16 whereby they are respectively positioned adjacent the conductors 19 and 20 of the cable 18. In order to receive nuts 36 and 37 for affixing the terminal screws 32 and 33, respectively, to the body member, the apertures 34 and 35 may terminate in enlarged countersunk indentations 38 and 39 formed in the top of the body member.

In order to provide a relatively high resistance discharge path from each of the terminals 32 and 33 to ground through the brackets 28 and 29, thereby to relieve the antenna connected to one end of the cable 18 of any static charge accumulated as a result of its exposure to atmosphere, a fixed resistor (not shown in the drawings) may be connected between each terminal and the bolt 23 or, alternatively, the top of the cavity 13 may be coated with a resistive film interconnecting each terminal and the bolt 23. The bottom of the cavity 13 is sealed by a resistance compound 40. If desired, the compound 40 may be poured while in a molten state into the cavity 13 in a sufficient amount to cover the heads of the terminal screws 32 and 33 and the nut 26 on the bolt 23. However, as illustrated in Fig. 2, a disc 41 of cardboard or other insulating material is preferably inserted into the cavity 13 prior to pouring the compound, thereby reducing dielectric heat loss as well as the capacitance between the terminals 32 and 33. Obviously, the disc 41 is provided with a central aperture for receiving the bolt 23 in order to facilitate the insertion of the disc into the cavity 13.

In lightning arrestors of the type illustrated, it is common practice to mount upon each of the terminal screws 32 and 33 a contact including structure for penetrating the insulation 21 of the cable 18 and engaging the conductor 19 or 20 adjacent to that particular terminal. Generally, such contacts are of metal or other electrically conducting material and must be retained upon the terminals by suitable retaining members such, for example, as wing nuts or the like. The capacitance between terminal screws 32 and 33, the metal contacts which they carry, and the members for retaining the contacts upon the terminals, obviously shunts the transmission line 18 and sets up an undesirable mismatch to prevent the delivery of maximum energy from the television receiving antenna connected to one end of the cable 18 and the television receiver connected to the other end of that cable. Due to the fact that the capacitive reactance varies inversely with frequency, it will be apparent that the resulting mismatch becomes more pronounced as the frequency of the received waves increases. Since most of the television lightning arrestors presently in use are of the type designed for use with television receivers in the V. H. F. band, it will be further apparent that the present tendency for transmitting stations to employ frequencies in the U. H. F. television band has rendered many of these lightning arrestors obsolete.

In accordance with the present invention, the terminal screws 32 and 33 of the lightning arrestor 10 are adapted to receive the relatively small attachments **11*a* and 11*b*, respectively, for the purpose of reducing the shunt capacitance between the terminals and minimizing its effect. As best shown in Figs. 3 and 4, each of these attachments comprises a body member 42 formed of insulating material such, for example, as ceramic and having an opening 43 therethrough for accommodating its associated terminal screw. The body member 42 is illustrated as being of oval or elliptical configuration although it will be apparent that the particular shape of the body member is of little significance since many other shapes could be used without impairing the operation of the attachment. In order to receive an isolating coil or inductor 44, the purpose of which will be apparent from the ensuing description, the body member 42 is provided with a second opening 45 extending parallel to the opening 43. To provide electrical contacts for the upper and lower surfaces of the body member 42, the entire top surface of the body member is fired with a thin layer of conducting paint such as silver, or the like, designated as 46 while the bottom surface is only partially covered with a similar layer as indicated at 47**.

For the purpose of receiving one end of the isolating coil 44, the layer 46 has soldered or otherwise secured thereto a thin wafer 48 of brass or other conducting material which covers the top of the body member 42. The other end of the coil 44 passes through a small aperture **49*a* in a contact member 49 carried by the body member in order that the end of this coil may be affixed, as by soldering, to the contact member. The contact is preferably soldered to the layer 47 in order to join the same to the body member 42. The contact 49 includes a plurality of downwardly extending teeth 50 for the purpose of penetrating the insulation 21 of the cable 18 and engaging one of the conductors of the cable when pressure is exerted on top of the body member 42 by threading the wing nuts 51 and 52 onto the terminal screws 32 and 33, respectively. In order to minimize the capacitance between terminal screws 32 and 33, the contact 49 is very small and touches no other large body of metal prior to its engagement with the end of the inductor 44**.

From the foregoing explanation it will be apparent that the attachments **11*a* and 11*b* are secured to the terminal screws 32 and 33, respectively, by tightening the wing nuts 51 and 52 in order to establish electrical contact between each terminal and one of the conductors of the cable. Specifically, electrical contact between the terminal 32 and the conductor 19 is established by the attachment 11*a* through contact 49, through the layer 47, through inductor 44, and through layer 46 and wafer 48 in engagement with the wing nut 51 and the terminal screw 32. Electrical contact between terminal screw 33 and conductor 20 is established through similar elements of the attachment 11*b*. When the attachments are thus assembled on the lightning arrestor, the electrical circuit between the television receiving antenna 53 and the receiver 54 connected to opposed ends of the transmission line 18 is equivalent to the schematic diagram shown in Fig. 5. In this schematic diagram the lightning arrestor 10 including attachments 11*a* and 11*b* is illustrated as being connected directly across the conductors 19 and 20 of the transmission line 18. The inductor 44 of each attachment, as shown, is effectively connected in series with a parallel resistor-capacitance combination consisting of the shunt capacitance 55 between terminals 32 and 33 and the resistance of compound 40**.

In order to minimize the effect of the shunt capacitance the inductors 44 are preferably of such value that they resonate with the distributed capacitance 55 at some frequency below the frequency band being isolated. Specifically, in a lightning arrestor for use with television receivers, the resonant frequency of the inductors 44 and the distributed capacitance 55 between the terminals lies between the V. H. F. and U. H. F. bands. The described series resonant circuit is inductive at frequencies above the resonant frequency and has a high inductive value near the top of the U. H. F. band, thereby to prevent the shunting of the cable 18 with an increasing susceptance as the frequency increases. Therefore, it is apparent from the foregoing explanation that the attachments **11*a* and 11*b* provide effective energy transfer from the antenna 53 to the receiver 54** at all frequencies in both the V. H. F. and U. H. F. bands.

Although it is preferred to employ the described inductors for isolating the conductors of the transmission line, it is apparent that other combinations of circuit parameters may be inserted within or near the opening 43 if desired. Thus, for example, in areas where interference with television reception at a particular frequency is prevalent it may be desirable to employ a band reject filter to eliminate such interference. Other circuits which may be advantageously assembled upon the attachments **11*a* and 11*b*** will be obvious to those skilled in this art.

From the foregoing explanation, it will be apparent that the present invention affords a satisfactory solution to the problem of providing a lightning arrestor for use with television receivers in both the U. H. F. and V. H. F. bands. Furthermore, the present invention provides an extremely simple, inexpensive and yet reliable means for preventing existing television lightning arrestors from being rendered obsolete by conversion of the receiver to U. H. F. reception. Moreover, the attachments provided by the invention for converting present television lightning arrestors for dual use in the V. H. F. and U. H. F. bands may be assembled by even the most unskilled operator, thus facilitating the desired conversion with a minimum of time and expense.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. In combination with a lightning arrestor of the type having a pair of terminals adapted to be connected across a two conductor transmission line leading from an antenna to an electromagnetic wave receiver; means mounted on said lightning arrestor for electrically connecting each of said terminals with a different one of the conductors of said transmission line, said means comprising a pair of spaced contacts penetrating said transmission line and each contacting one of said conductors, and a pair of isolating circuits respectively connected between each of said contacts and a different one of said terminals, said circuits each including an inductor and being so proportioned that they cooperate with the distributed impedances between said terminals to effectively isolate the conductors of said transmission line and prevent a mismatch between the antenna and the transmission line.

2. In combination with a lightning arrestor of the type having a pair of terminals adapted to be connected across a two conductor transmission line leading from an antenna to an electromagnetic wave receiver; a detachable connector mounted on said lightning arrestor for electrically connecting each of said terminals with a different one of the conductors of said transmission line, said connector comprising a pair of spaced contacts penetrating said transmission line and each contacting one of said conductors, and a pair of isolating circuits respectively carried by the connectors and respectively connected between each of said contacts and a different one of said terminals, said circuits each including an inductor and being so proportioned that they cooperate with the distributed impedances between said terminals to effectively isolate the conductors of said transmission line and prevent a mismatch between the antenna and the transmission line.

3. In combination with a lightning arrestor of the type having a pair of terminals adapted to be connected across a two conductor transmission line leading from an antenna to an electromagnetic wave receiver; an attachment detachably mounted upon each of said terminals for respectively connecting each terminal with one of the conductors of said transmission line, each attachment comprising a body member of insulating material, a contact mounted on said body member for penetrating the transmission line and engaging one of said conductors, and an isolating circuit carried by said body member and including an inductor, said circuit having one end electrically contacting said contact and its other end in electrical contact with its associated terminal in order effectively to isolate each conductor of the transmission line and thereby prevent a mismatch between the antenna and the transmission line.

4. In combination with a lightning arrestor of the type having a pair of terminals adapted to be connected across a two conductor transmission line leading from an antenna to an electromagnetic wave receiver; an attachment detachably mounted upon each of said terminals for respectively connecting each terminal with one of the conductors of said transmission line, each attachment comprising a body member of insulating material, a contact mounted on said body member for penetrating the transmission line and engaging one of said conductors, and an inductor carried by said body member having one end electrically contacting said contact and its other end in electrical contact with its associated terminal in order effectively to isolate each conductor of the transmission line and thereby prevent a mismatch between the antenna and the transmission line.

5. In combination with a lightning arrestor of the type having a pair of terminals adapted to be connected across a two conductor transmission line leading from an antenna to a television receiver; means mounted on said lightning arrestor for electrically connecting each of said terminals with a different one of the conductors of said transmission line, said means comprising a pair of spaced contacts penetrating said transmission line and each contacting one of said conductors, and a pair of isolating circuits each including a coil and respectively connected between each of said contacts and a different one of said terminals for effectively isolating the conductors of said transmission line and preventing a mismatch between the antenna and the transmission line, said coils having such value as to resonate with the distributed capacitance between said terminals at a frequency below the U. H. F. television band.

6. In combination with a lightning arrestor of the type having a pair of terminals adapted to be connected across a two conductor transmission line leading from an antenna to a television receiver; means mounted on said lightning arrestor for electrically connecting each of said terminals with a different one of the conductors of said transmission line, said means comprising a pair of spaced contacts penetrating said transmission line and each contacting one of said conductors, and a pair of isolating circuits each including an inductor and respectively connected between each of said contacts and a different one of said terminals for effectively isolating the conductors of said transmission line and preventing a mismatch between the antenna and the transmission line, each of said inductors having such value as to resonate with the distributed capacitance between said terminals at a frequency between the V. H. F. and U. H. F. television bands.

7. In combination with a lightning arrestor of the type having a pair of terminals adapted to be connected across a two conductor transmission line leading from an antenna to a television receiver; an attachment detachably mounted upon each of said terminals for respectively connecting each terminal with one of the conductors of said transmission line, each attachment comprising a body member of insulating material, a contact mounted on said body member for penetrating the transmission line and engaging one of said conductors, and an isolating circuit carried by said body member having one end electrically contacting said contact and its other end in electrical contact with its associated terminal in order effectively to isolate each conductor of the transmission line and thereby prevent a mismatch between the antenna and transmission line, said circuit including an inductor having such value as to resonate with the distributed capacitance between said terminals at a frequency below the U. H. F. television band.

8. In combination with a lightning arrestor of the type having a pair of terminals adapted to be connected across a two conductor transmission line leading from an antenna to a television receiver; an attachment detachably mounted upon each of said terminals for respectively connecting each terminal with one of the conductors of said transmission line, each attachment comprising a body member of insulating material, a contact mounted on said body member for penetrating the transmission line and engaging one of said conductors, and an isolating circuit carried by said body member having one end electrically contacting said contact and its other end in electrical contact with its associated terminal in order effectively to isolate each conductor of the transmission line and thereby prevent a mismatch between the antenna and the transmission line, said circuit including an inductor having such value as to resonate with the distributed capacitance between said terminals at a frequency between the V. H. F. and U. H. F. television bands.

9. An attachment device adapted detachably to be mounted on a lightning arrestor of the type having a pair of terminals connected across a two-conductor transmission line leading from an antenna to an electromagnetic wave receiver, which device comprises a body member, at least one contact carried on the under side of said body member and having a downwardly extending transmission line penetrating portion adapted to contact one of said conductors when said device is mounted upon the lightning arrestor, said body member having a first opening therein extending through the body member from the under side thereof, and an isolating circuit including an inductor disposed within said first opening, said circuit being electrically connected to said contact and said inductor having such value as to cooperate with the distributed impedance between said conductors to effectively isolate said one conductor to prevent a mismatch between the antenna and the transmission line, said body member having a second opening therein extending substantially parallel to said first opening to facilitate attachment of the body member to the lightning arrestor.

10. An attachment device adapted detachably to be mounted upon a lightning arrestor of the type having a pair of terminals connected across a two-conductor transmission line leading from an antenna to an electromagnetic wave receiver, which device comprises a body member, at least one contact carried by said body member and having a portion adapted to penetrate said transmission line in order to engage one of said conductors, and an inductor carried by said body member and connected to said contact, said inductor having an inductance of such value as to resonate with the distributed impedance between said conductors at a frequency below the U. H. F. band in order to prevent an impedance mismatch between the antenna and the transmission line at frequencies in the U. H. F. band.

11. An attachment device adapted detachably to be mounted upon a lightning arrestor of the type having a pair of terminals connected across a two-conductor transmission line leading from an antenna to an electromagnetic wave receiver, which device comprises a body member, at least one contact carried by said body member and having a portion adapted to penetrate said transmission line in order to engage one of said conductors, and an inductor carried by said body member and connected to said contact, said inductor having an inductance of such value as to resonate with the distributed capacitance between one of the terminals of the lightning arrestor and ground at a frequency below the U. H. F. band, thereby to prevent a mismatch between the antenna and the transmission line.

12. An attachment device adapted detachably to be mounted upon a lightning arrestor of the type having a pair of terminals connected across a two-conductor transmission line leading from an antenna to an electromagnetic wave receiver, which device comprises a body member, at least one contact carried by said body member for penetrating said transmission line to contact one of said conductors, and an inductor carried by said body member and having an inductance of such value as to resonate with the distributed capacitance between one of the terminals of the lightning arrestor and ground at a frequency between the U. H. F. and V. H. F. bands in order to prevent a mismatch between the antenna and the transmission line.

13. In combination, a lightning arrestor adapted to be connected to a two-conductor transmission line extending between an antenna and a wave receiver, said lightning arrestor having a main body, a pair of terminals, each having one end extending outwardly from said body and high voltage suppressing means associated with the other end of said terminals; a pair of attachment devices; and means for detachably securing one of said attachment devices to each of the terminals of said lightning arrestors, each of said attachment devices comprising a body member having a first opening therein accommodating one of said terminals, a contact carried on one side of said body member and having a transmission line penetrating portion in engagement with one of the conductors of the transmission line, said body member having a second opening therein, and an isolating circuit including an inductor disposed within said second opening for effectively isolating each of the conductors in order to prevent an impedance mismatch between the antenna and the transmission line.

14. In combination, a lightning arrestor adapted to be connected to a two-conductor transmission line extending between an antenna and a wave receiver, said lightning arrestor having a main body, a pair of terminals, each having one end extending outwardly from said body and high voltage suppressing means associated with the other end of said terminals; a pair of attachment devices; and means for detachably securing one of said attachment devices comprising a body member having a first opening therein accommodating one of said terminals, a contact carried on one side of said body member and having a transmission line penetrating portion in engagement with one of the conductors of the transmission line, said body member having a second opening therein, and an isolating circuit including a coil disposed within said second opening, said coil having an inductance of such value as to resonate with the distributed capacitance of its associated terminal at a frequency below the U. H. F. band in order to prevent an impedance mismatch between the antenna and the transmission line.

References Cited in the file of this patent

UNITED STATES PATENTS

| | | |
|---|---|---|
| 1,547,242 | Strieby | July 28, 1925 |
| 2,666,908 | Klostermann | Jan. 19, 1954 |
| 2,677,108 | Brady | Apr. 27, 1954 |
| 2,694,182 | Edlen | Nov. 9, 1954 |

FOREIGN PATENTS

| | | |
|---|---|---|
| 691,802 | Great Britain | May 20, 1953 |